UNITED STATES PATENT OFFICE.

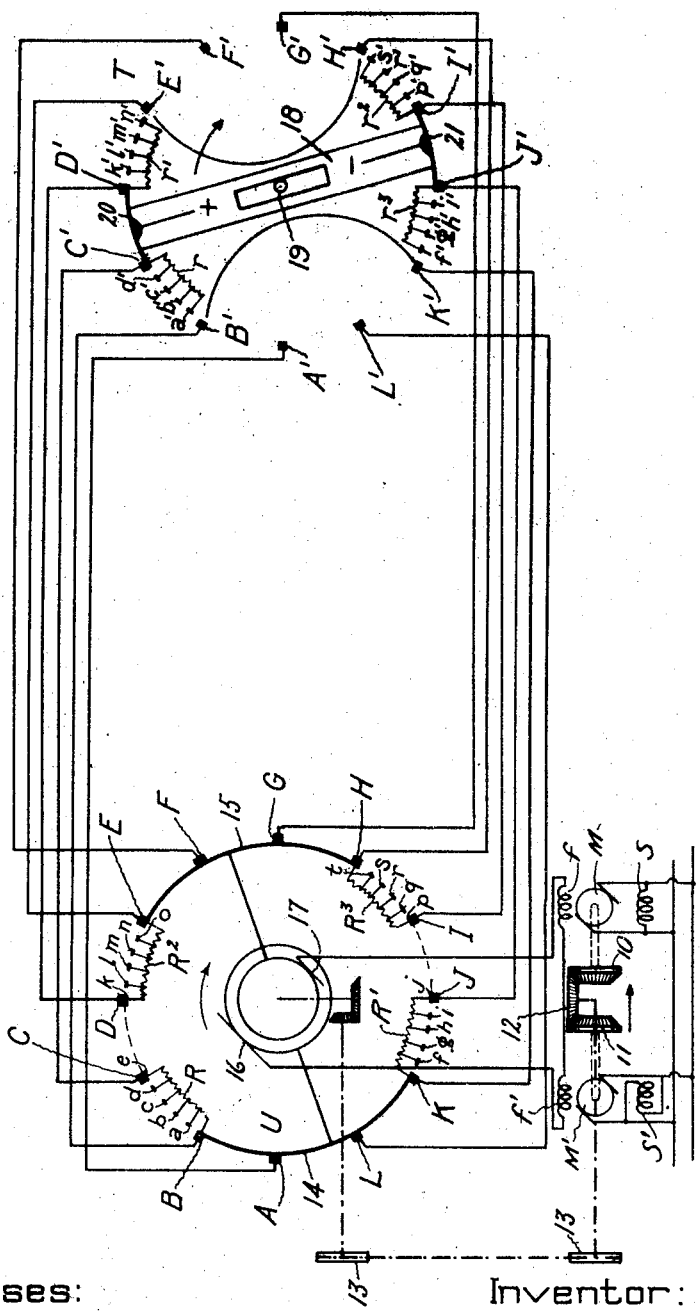

CHRISTIAN KRÄMER, OF BERLIN, GERMANY, ASSIGNOR TO GENERAL ELECTRIC COMPANY, A CORPORATION OF NEW YORK.

MOTOR-CONTROL SYSTEM.

1,077,725.     Specification of Letters Patent.     Patented Nov. 4, 1913.

Application filed June 14, 1912. Serial No. 703,607.

*To all whom it may concern:*

Be it known that I, CHRISTIAN KRÄMER, a subject of the Emperor of Germany, residing at Berlin, Germany, have invented certain new and useful Improvements in Motor-Control Systems, of which the following is a specification.

This invention relates to devices for controlling electric motors and has for its object the provision of means whereby an electric motor may be controlled from a remote point in a simple and reliable manner.

My invention relates more specifically to the control of motors which are employed for operating rudders, searchlight projectors and the like, the object being to provide improved means whereby the movement of the transmitting mechanism in the hands of an operator at a remote point will be reproduced at the motor. Devices of this kind have been commonly used but for the most part have been open to the objection that a large number of conductors are necessary between the transmitting and the receiving stations in order to obtain an equal number of controlling positions. Transmitting and receiving stations are frequently long distances apart and the provision of a large number of conductors is expensive.

In my previous patents Nos. 1,042,692 and 1,042,693, I have disclosed systems of control of this character in which a large number of control positions is obtained with a relatively small number of wires between the transmitting and receiving stations. In certain cases, however, as for instance in the case of searchlight projectors, it is desirable to be able to rotate the projector continuously in one direction while at the same time obtaining a large number of control positions with a comparatively small number of connecting wires.

One of the objects of my invention, therefore, is to provide an improved control of this character in which the number of connecting wires is reduced to the minimum and which it is possible to rotate continuously in one direction.

Other objects and purposes of my invention will appear in the course of the following specification in which I have shown my invention embodied in concrete form for purposes of illustration.

In the accompanying drawings illustrating my invention diagrammatically, T represents the transmitting mechanism which may be operated manually at a remote point from the motor or motors to be controlled and U represents the receiving controller located preferably at the motor or motors and driven thereby. In the present instance it will be observed that I have provided two motors M and M' for driving the controller U which moves with the device to be controlled, as for instance the projector or the like. The particular arrangement of the motors and the driving connections with the controller U form no part of my present invention and are simply shown in their present form for purposes of illustration. It is obvious, of course, that in some instances it will be unnecessary to use two motors and that various other driving connections may be employed. In the present instance, therefore, the driving connection between the two motors and the controller U consists of a differential gearing comprising two bevel gears 10 and 11 driven by the motors M and M' respectively. These motors are provided with the usual shunt field windings S and S'. These motors M and M' are also provided with field windings $f$ and $f'$ respectively. These two field windings $f$ and $f'$ are so connected that one reinforces the shunt winding with which it is associated while the other opposes its corresponding shunt winding. So long, therefore, as the two field windings $f$ and $f'$ are without current the two motors M and M' run at the same speed and the planetary gear 12 of the differential gearing will revolve on its own axis. When, however, current flows through the field windings $f$ and $f'$ the excitation of one motor is increased while that of the other motor is decreased, causing the speed of one motor to be increased and that of the other to be decreased. This will cause the planetary gear 12 to rotate about the axis of the wheels 10 and 11 in a well known manner, thereby driving the controller U through the sprocket gearing 13, the speed being proportional to the difference in speeds of the motors. Furthermore, the direction of rotation will depend upon the direction of current through the fields $f$ and $f'$.

The controller U is circular in form and is divided into two halves which are separate and insulated from each other, one-half consisting of the conducting segment 14 connected at its ends with two resistances R and R' divided into sections by contacts $a$, $b$, $c$, $d$ and $e$, and $f$, $g$, $h$, $i$, $j$, respectively. The other half of the controller consists of a similar conducting segment 15 connected with similar resistances $R^2$ $R^3$ which in turn are divided into sections by contacts $k$, $l$, $m$, $n$, $o$ and $p$, $q$, $r$, $s$, $t$. Around the circumference of the controlling member is located a plurality of contact brushes A, B, C, D, E, F, G, H, I, J, K and L, which coöperate with the contact segments and the resistance contacts. These brushes are spaced equal distances apart, the contacts of the resistances R, R', etc., occupying a space equal to the distance between the brushes. The two sections of the controller are also spaced apart a distance equal to the space between the brushes.

The fields $f$ and $f'$ of the motor are connected with the conducting segments 14 and 15 of the controller by brushes 16 and 17 coöperating with slip rings which rotate with the controller. The transmitting device T consists of a number of brushes A', B', C', D', E', F', G', H', I', J', K', L' arranged in a circle, each being connected with a correspondingly lettered brush on the controller by wires as shown. The movable member of the transmitting device consists of an arm 18 pivoted at 19 and provided at opposite ends with the contact plates 20, 21 respectively, the former being connected to the positive side of the circuit while the latter is connected with the negative side. The plates 20 and 21 are of sufficient width to span two brushes and on each side of the plates I arrange the resistances $r$, $r'$, $r^2$ and $r^3$ respectively, each resistance extending for a space equal to the space between the brushes on each side so that for each plate with its connecting resistances covers three brush spaces. The resistances $r$, $r'$, $r^2$ and $r^3$ are divided into sections corresponding to those on controllers $a'$, $b'$, $c'$, $d'$; $f'$, $g'$, $h'$, $i'$; $k'$, $l'$, $m'$, $n'$ and $o'$, $p'$, $q'$, $r'$, $s'$. As the arm rotates the contact plates 20 and 21 and the resistance contacts associated therewith engage the various brushes in a well-known manner.

The mode of operation of the device just described is as follows: With the parts in the position shown in the drawing, it will be observed that current from the positive side of the line divides at the plate 20. The circuit from the brush C' will pass through brush C on the controller, thence through the resistance R, R' to brush J, and plate 21 to the negative side of the line, while the circuit through the brush D' passes through resistance $R^2$, $R^3$, through the brush I, and thence to the negative side of the line. It will thus be seen that the resistances R, R', $R^2$ and $R^3$ form a Wheatstone bridge, the motor fields $f$ and $f'$ being connected with contact segments 14 and 15. In the position shown in the drawing the four resistances R to $R^3$ are of equal size and therefore no current flows across the diagonal through the motor fields. The planetary gear 12 therefore merely rotates about its axis and does not drive the controller. If now the transmitting device is rotated in the direction indicated by the arrow until the contacts $n'$ and $f'$ engage brushes E' and K' respectively, then the resistances in two of the legs of the Wheatstone bridge are increased while the resistances in the other two legs are decreased. The resistances of the legs containing R' and $R^2$ are decreased by having the resistances $r^3$ and $r'$ connected in parallel with the resistances R' and $R^2$ respectively, since a circuit is now completed from the positive side of the line to brush D', and through the resistance $r'$ to brush E' while the brushes J and K are both connected to the negative side of the line, the latter through resistance $r^3$. The resistances of the legs containing R and $R^3$ are increased by having a section of the resistance $r$ connected in series with resistance R and a section of resistance $r^2$ connected in series with resistance $R^3$. This increase is brought about by the engagement of brush C' with contact $d'$ and the engagement of the brush I' with contact $p'$. The resistance of two diametrically opposite legs of the bridge being increased while the resistance of the other two legs is decreased, the balance will be disturbed and there will be a difference of potential across the diagonal in which the motor fields are connected. Current will therefore flow through the two field windings $f$ and $f'$, causing one of the motors to be accelerated and the other retarded. This causes the controller U to be rotated. The controller will rotate one step until a balanced condition occurs in which no current will flow through the field windings $f$ and $f'$. When the controller has moved one step the circuit will be as follows: From the positive side of the line through one section of the resistance $r$ and four sections of resistance R, thence through one section of resistance R', and four sections of resistance $r^3$. On the other branch current will flow from the positive side of the line through four sections of resistance $r'$, and one section of resistance $R^2$, thence through four sections of resistance $R^3$ and one section of resistance $r^2$. These various sections of resistance being equal it will be seen that there are now five sections of resistance on each side of the bridge so that no current will flow through the motor fields. In like manner, if the transmitting device is moved further the balance of the bridge is again disturbed and the motor started, whereupon the controller moves to again establish a balance. It will be noted that the arrangement is such that the transmitting device can be rotated continuously in one direction and that the receiving controller to which is attached the device to be controlled, for instance a projector, will follow this movement continuously. It will be understood that while I have described my invention as embodied in concrete form and as operating in a specific manner, I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is,—

1. The combination with electromagnetic driving means, of a controller therefor driven by said means having resistances connected in two parallel branch circuits, connections for said driving means across equi-potential points on said branches, a transmitting device comprising variable resistances arranged to be connected in circuit with the controller resistances to cause unequal potential at the terminals of said driving means, and connections whereby the movement of the controller in response to movement of the transmitting device restores the equal potential conditions.

2. The combination with electromagnetic driving means, of a controller therefor driven by said means having four resistances arranged in the form of a Wheatstone bridge with the driving means across the equi-potential points, a transmitting device comprising variable resistances arranged to be connected in circuit with the controller resistances to cause unequal potential at the terminals of said driving means, and connections whereby said controller will be rotated through a predetermined movement to an equi-potential position in response to a corresponding movement of the transmitting device.

3. The combination with electromagnetic driving means, of a controller therefor driven by said means having resistances connected in two parallel branch circuits, connections for said driving means across equi-potential points on said branches, a transmitting device comprising variable resistances arranged to be connected in circuit with the controller resistances to cause unequal potential at the terminals of said driving means, and connections whereby said controller will rotate continuously in either direction in response to a corresponding movement of the transmitting device and restore the equi-potential conditions to stop the controller each time it reaches a position corresponding to the position of the transmitting device.

4. The combination with electromagnetic driving means, of a controller therefor driven by said means divided into two halves each consisting of two sectional resistances and a contact plate connecting the same, connections from the terminals of said driving means to said contact plates respectively, a transmitting device connected with the supply circuit and including four resistances connected with the four resistances on the controller, and connections whereby the controller will move to a position in which the driving means is connected across equi-potential points in response to a corresponding movement of the controller.

5. The combination with electromagnetic driving means, of a controller therefor driven by said means comprising a circular member divided into two insulated halves each consisting of a contact segment having a sectional resistance provided with contacts connected with each end and a plurality of brushes around said member engaging said segments and contacts, a transmitting device comprising similarly arranged brushes each connected with a corresponding brush on the controller and a controlling member cooperating therewith having a contact plate at each end bridging adjacent brushes and connected to opposite sides of the supply circuit, a sectional resistance provided with contacts connected with each end of each of said plates, a connection for the driving means across the contact segments of the controller, and connections whereby movement of the transmitting device varies the resistance connected therewith to cause a difference of potential at the terminals of said driving means and a corresponding movement of the controller establishes equi-potential conditions to stop the controller.

6. The combination with a pair of electric motors, of a controller therefor, mechanical driving connections between said motors and said controller whereby the controller is not driven when the motors rotate at the same speed, resistances on said controller constituting a Wheatstone bridge, said motors having windings connected across the equi-potential points on the bridge, a transmitting device including resistances arranged to unbalance the bridge and cause the motors to drive the controller, and connections whereby said movement of the controller restores the balance and stops the controller.

7. The combination with a pair of electric motors normally operating at the same speed, of a controller therefor, mechanical driving connections between said motors and said controller whereby the latter is not driven while the motors operate at the same speed, resistances on said controller constituting a Wheatstone bridge, windings for said motors connected across the equi-potential points on said bridge which when energized cause said motors to operate at different speeds, a transmitting device including resistances arranged to unbalance the bridge and energize said windings, and connections whereby movement of the controller restores the balance and stops the controller.

In witness whereof, I have hereunto set my hand this 23d day of May, 1912.

CHRISTIAN KRÄMER.

Witnesses:
 WALTHER REINHARDT,
 LIONEL FLEISCHMANN.